May 29, 1934.  R. C. SHAND  1,960,831

VALVE CONTROL SYSTEM

Filed April 17, 1929  5 Sheets-Sheet 1

FIG_1_

FIG_2_

INVENTOR
Reginald C. Shand
BY
White, Prost & Fryer
ATTORNEYS

May 29, 1934.  R. C. SHAND  1,960,831
VALVE CONTROL SYSTEM
Filed April 17, 1929  5 Sheets-Sheet 2

FIG_3_

FIG_4_

INVENTOR
Reginald C. Shand
BY
White, Prost & Fryer
ATTORNEYS

May 29, 1934.    R. C. SHAND    1,960,831
VALVE CONTROL SYSTEM
Filed April 17, 1929    5 Sheets-Sheet 3

FIG_5_

FIG_6_

FIG_7_

INVENTOR
Reginald C. Shand
BY
White, Prost & Fryer
ATTORNEYS

May 29, 1934.  R. C. SHAND  1,960,831
VALVE CONTROL SYSTEM
Filed April 17, 1929   5 Sheets-Sheet 5

INVENTOR
Reginald C. Shand
BY
White, Prost & Fryer
ATTORNEYS

Patented May 29, 1934

1,960,831

UNITED STATES PATENT OFFICE 1,960,831

VALVE CONTROL SYSTEM

Reginald C. Shand, Piedmont, Calif., assignor to Shand & Jurs Company, Berkeley, Calif., a copartnership composed of Reginald C. Shand and Albert E. Jurs Application April 17, 1929, Serial No. 355,711

7 Claims. (Cl. 137—21)

This invention relates generally to systems for effecting the operation of a plurality of valves and is particularly applicable to systems utilizing a fluid under pressure as an operating medium. In its preferred form, the system is employed for selectively dispensing liquid from a plurality of tanks.

It is a general object of this invention to devise a system of the character described above, having novel means whereby an operator can select any one of the valves to be operated.

It is a further object of this invention to devise a novel fluid distributing valve combined in a novel manner with a fluid pressure device.

It is a further object of this invention to devise novel means in a system of the above character which will insure closure of all valves except the selected valve to be operated.

It is a further object of this invention to devise a novel form of selecting or distributing valve combined with a fluid pressure device in such a manner that during the compression stroke of the device, the distributing valve is locked in its selected position.

It is a further object of this invention to design a liquid dispensing system adapted for use in conjunction with a motor tank truck, which will disrupt the ignition circuit of the truck motor while liquid is being dispensed.

It is a further object of this invention to devise a novel form of dispensing nozzle particularly adapted for dispensing inflammable liquid, and which is provided with a valve which automatically closes in case of fire.

It is a further object of this invention to devise a novel structure for establishing communication between a dispensing conduit and a fluid operated tank valve, whereby the valve can be removed bodily without disrupting the connection between the conduit and the tank.

It is a further object of this invention to devise a novel form of vent for use in conjunction with a liquid tank.

It is a further object of this invention to devise a hydraulic dispensing system in which fluid under pressure is employed for actuating one or more tank valves, and which has means whereby an operator can effect an emergency closure of a valve independently of the source of fluid pressure.

It is a further object of this invention to devise a novel form of linkage mechanism for actuating a fluid pressure piston or plunger.

Further objects of the invention will appear from the following description in which I have set forth the preferred embodiment of my invention. It is to be understood that the appended claims are to be accorded a range of equivalents consistent with the state of the prior art.

Referring to the drawings:

Fig. 3 is a side elevational view in cross section, illustrating one of the fluid pressure operated valves utilized in my system, and the manner in which fluid pipes are connected thereto.

Fig. 4 is a cross-sectional detail, illustrating a modification of the structure shown in Figure 3.

Figure 1:
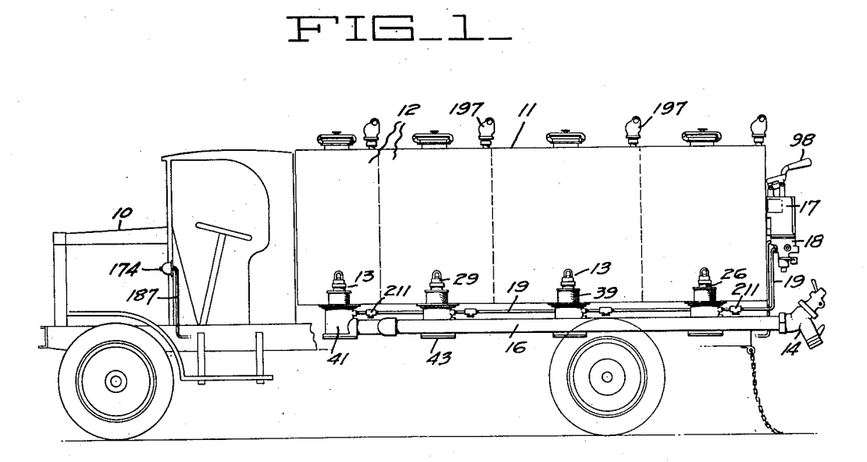
Figure 1 is a side elevational view illustrating my system applied to a motor tank truck.

The various novel features of my system can best be understood by a detail description of the preferred form shown in the drawings. In Fig. 1 I have shown the system being utilized for the purpose of dispensing liquids, such as gasoline, from motor tank trucks. Thus I have shown a motor truck 10 carrying a liquid tank 11, this tank being divided into a plurality of individual compartments or tanks 12. Associated with the lower portion of each individual tank 12, I have shown valves 13, which are connected to dispensing faucets 14, thru the individual conduits 16. Valves 13 are preferably constructed in such a manner that they can be actuated by fluid pressure from a remote point, and as a convenient source of fluid pressure I provide a pressure device 17, which is connected to a selecting or distributing valve 18. Distributing valve 18 is in turn connected to the valves 13, by means of separate pressure transmitting pipes 19.

The construction of the valves 13 and their associated parts, is shown in detail in Fig. 3. They each consist of a body member 21 formed to provide an annular valve seat 22, and having a passage 23 for flow of fluid thru the body. Cooperating with the valve seat 22, I provide a movable valve member 24 carried upon the lower end of a sleeve or cylinder 26. Mounted upon body 21, there is an upstanding member 27 arranged centrally of the cylinder 26. A piston 28, formed of suitable cup washers, is secured to the upper portion of member 27, and has a fluid tight fit with the inner walls of cylinder 26. The upper end of cylinder 26 is closed by a suitable cap 29, and fluid under pressure can be introduced above piston 28 thru a passage 31 in member 27. For normally urging the valve toward closed position, I provide a helical spring 32 surrounding member 27, one end of this spring being seated upon an annular shoulder 33 formed upon member 27, and the other end being seated upon an annular abutment 34 secured to the lower end of cylinder 26. For securing the body 21 of the valve to the lower wall 36 of the tank with which it is associated, I have shown suitable means such as an annular flange 37 welded or otherwise secured to the wall 36, and body 21 has a detachable threaded connection 38 with this flange 37. A cylindrical strainer 39 has been shown mounted upon body 21 and extending upwardly about the lower portion of cylinder 26.

In the past valves of this character have been directly connected with pipes or conduits thru which liquid is to be removed from the tank. Thus when it was desired to remove such valves from the tank for making replacements or repairs, it was necessary to first disconnect the pipes from the valve, and to then remove the valve from the tank. In the structure shown in Fig. 3, the conduit 16 thru which liquid is to be removed from the tank, is connected to a casing 41, which in turn is in communication with the passage 23 in valve body 21. Thus the particular form of casing shown has a flange 42 welded or otherwise secured to the wall 36 of the liquid tank, about the flange 37. One wall of casing 41 is formed by a closure plate 43, removably secured to casing 41 by suitable means such as cap screws 44. When body 21 is unscrewed from flange 37, it is evident that it can be dropped thru casing 41, without disrupting the connection of conduit 16 with casing 41, or without changing the relationship of this conduit with the tank. For convenience body 21 is provided with a squared or hexagonal opening 46 which can be engaged by a suitable tool, after removal of closure plate 43.

For establishing communication between passage 31 and the fluid pressure pipe 19, I have shown communicating passages 47, 48 and 49 in body 21, passage 49 communicating with one end of a pipe or tube section 51. The other end of pipe section 51 is connected to the fluid pressure line 19, thru one wall of casing 41, as shown. Pipe section 51 is preferably made of copper or is more or less flexible, so that it can be readily uncoupled from body 21 before this body is unscrewed from flange 37, and so that it can be properly reconnected irrespective of the final normal position of body 21.

In Fig. 4 I have shown a slight modification of the construction shown in Fig. 3, in which flange 37 has been omitted and body 21 has a direct threaded connection 38 with the upper portion of casing 41. I have also in this modification shown an arrangement for establishing communication between passage 31 and fluid pressure line 19, which obviates the use of a flexible pipe section 51. Thus I have shown an annular flange 53 formed upon the lower end of body 21, the upper face of this flange seating upon an annular shoulder 54 formed upon casing 41. An annular fluid groove 56 is formed in shoulder 54, and communicates with fluid pressure line 19 thru passage 57. A passage 58 communicates with passage 49, and serves to communicate with groove 56 for any position of the valve body 21. Suitable gaskets 59 are arranged between flange 53 and shoulder 54, to effect a fluid-tight fit.

Figure 5:
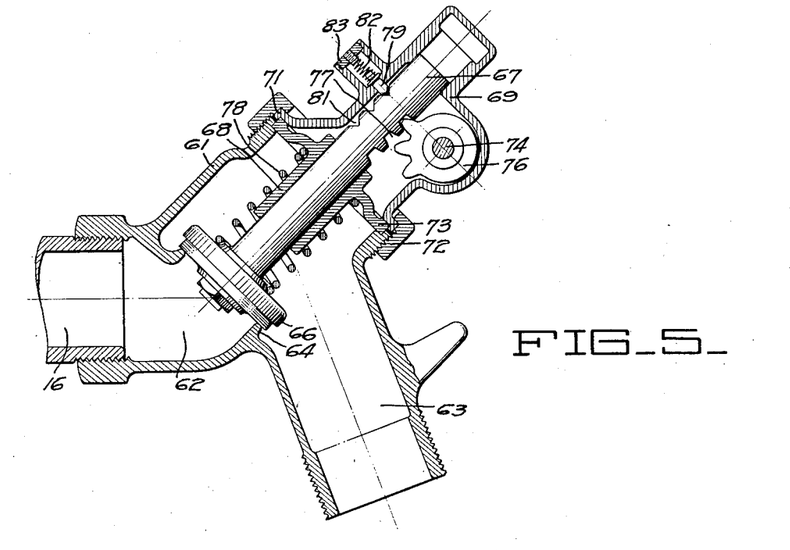
Fig. 5 is a side elevational view in cross-section, illustrating the construction of a faucet which I prefer to employ in my system.

The faucet construction which I prefer to employ is shown in detail in Fig. 5. It includes a body 61 having a passage 62 for connection with conduit 16, and having an outflow passage 63. Body 61 is formed to provide an inner annular valve seat 64, adapted to cooperate with a movable valve disc or member 66. A stem 67 is secured to disc 66, and extends laterally thru a suitable guide member 68. The outer end of stem 67 projects into a suitable housing 69, this housing having a flange portion 71 removably secured to the body by means of coupling ring 72. Ring 72 can also serve to clamp a flange portion 73, formed on guide member 68, against body 61. For actuating valve stem 67, I have shown a shaft 74 rotatably journaled in housing 69 and carrying a gear segment 76. The teeth of this gear segment engage a toothed rack 77, formed along one side of valve stem 67. For normally urging the valve toward closed position, I provide a helical spring 78 having its one end seated upon disc 66, and its other end seated upon the annular flange 73. A suitable handle or other operating member is secured to shaft 74, external of housing 69.

In order to retain the valve disc 66 in partly or full open position, I have shown a detent consisting of a member 79 in the form of a pin, slidably disposed within housing 69. The inner end of this pin is adapted to engage in any one of a plurality of spaced notches or recesses 81, formed in stem 67. Pin 79 is normally urged toward stem 67, by means of a compression spring 82. One end of spring 82 is seated upon pin 79, while the other end is seated upon a plug 83, this plug being removably secured to housing 69. Plug 83 is preferably made of a material which will fuse at a relatively low temperature, such as a low temperature metal alloy. Ordinarily when shaft 74 is rotated by the operator to open valve disc 66 partly or to full open position, pin 79 engaging in notches 81 provides sufficient friction for retaining the valve in such open position. However if the gasoline or other inflammable liquid being dispensed should catch fire, plug 83 will fuse to relieve the tension upon spring 82, thus permitting the valve disc to automatically return to closed position under tension of spring 78.

The fluid pressure device 17 and distributing valve 18, are shown in detail in Figs. 8 to 12 inclusive. The fluid pressure device preferably consists of a hollow body or casing 86, formed to provide a cylinder bore 87. The upper portion of the body is formed to provide a suitable liquid reservoir 88, this reservoir being closed by means of a removable plate 89. Collar 91 depending from plate 89, serves as a guide for a reciprocable piston rod 92. A piston 93 is secured to the lower portion of rod 92, and has a fluid tight fit in cylinder bore 87. A suitable packing washer 94 prevents leakage of liquid between collar 91 and rod 92. Liquid such as a lubricating oil can be introduced into reservoir 88 thru a removable plug or closure 96, and reservoir 88 has communication with cylinder bore 87 thru ports 97.

Figures 8, 9, 10, 11, 12:
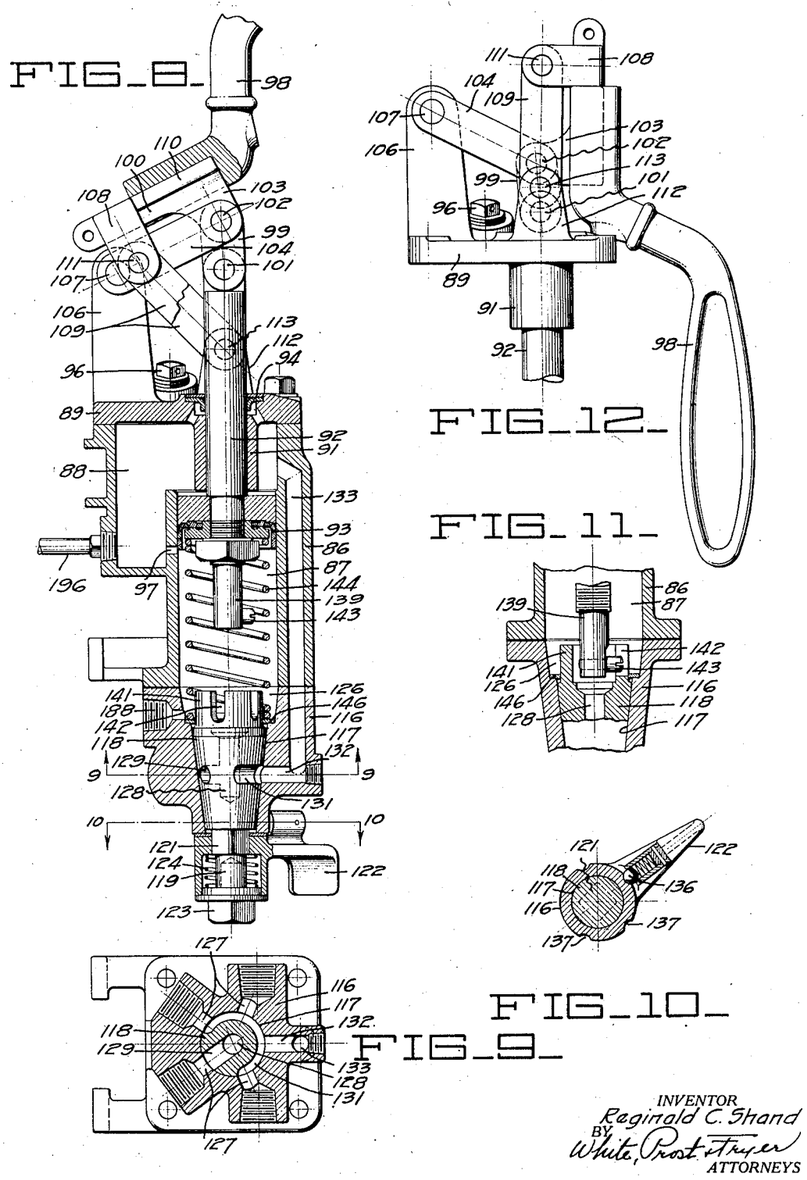
Fig. 8 is a side elevational view in cross-section, illustrating the construction of my fluid pressure device and its associated selecting or distributing valve.
Fig. 9 is a cross-sectional detail taken along the line 9—9 of Fig. 8.
Fig. 10 is a cross-sectional detail taken along the line 10—10 of Fig. 8.
Fig. 11 is a cross sectional detail illustrating the manner in which operation of the pressure system serves to lock the selecting valve in one selected position.
Fig. 12 is a detail illustrating a mode of operation of the linkage mechanism for actuating the fluid pressure piston or plunger.

For actuating piston rod 92, I have shown a suitable manual lever 98 adapted to be detachably connected to piston rod 92 thru suitable linkage mechanism. Thus I have shown a link 99 pivotally connected with the upper end of piston rod 92 by means of pivot pin 101. Pivot pin 102 serves to pivotally connect the other end of link 99 with lug 103, formed upon lever 100. Another link 104 has its one end conected to pin 102, and its other end pivotally connected to a standard 106 upstanding from plate 89, by means of pivot pin 107. Another portion of lever 100 has spaced lugs 108, having pivotal connection with corresponding ends of a pair of links 109, by means of pivot pin 111. The other corresponding ends of links 109 are pivotally connected to spaced lugs 112 upstanding from 89, by means of pivot pins 113. Lever 98 has a substantially T-shaped groove so that it can be slipped over flange 110 formed upon lever 100.

The various links and pivotal connections described above are arranged so as to assume a position shown in Fig. 8, when the lever 98 is in raised position, and to assume the position shown in Fig. 12 when the lever 98 is depressed. In the operation of this mechanism, it is to be noted that when lever 98 is being forced downwardly, pivot pin 102 is constrained to follow the arc of a circle, because of links 104. Therefore the downward thrust transmitted by links 99 to the piston rod 92, will be always in substantial alinement with the axis of the piston rod. Furthermore as lever 98 is being depressed, pivot pin 111 swings towards pivot pin 102, and finally passes the line of centers between pins 102 and 113, in the full depressed position of lever 98 shown in Fig. 12. Thus when the lever 98 is fully depressed, a toggle effect is formed which locks the piston rod 92 at the bottom of its down or compression stroke, so that any amount of fluid pressure in cylinder bore 87 cannot raise the piston rod without manual lifting of lever 98. In such fully depressed position, lever 98 cannot be removed from lever 100, as is evident from Fig. 12, thus preventing an operator from removing lever 100 when valve 13 is open. Spring 144 is sufficiently strong that an operator cannot move lever 100 without handle 98. It is also characteristic of this linkage mechanism that the effective mechanical advantage or leverage which an operator can exert by movement of lever 98, increases as lever 98 is depressed, so that the relatively high pressure produced at the end of the stroke of piston rod 92, will not unduly increase the manual force applied to lever 98. When piston 93 is at the upper limit of its movement, it is to be noted that liquid is free to flow from reservoir 88 thru ports 97 into cylinder bore 87. However such communication between the reservoir and the cylinder bore is interrupted when the piston 80 is moved downwardly to compress the liquid beneath the same.

The selecting or distributing valve 18 is preferably mounted directly upon the casing 86. Thus I have shown a hollow valve body 116 removably secured to the lower end of casing 86. This body is formed to provide a valve seat 117, within which is seated a tapered or conical rotatable valve member 118. For rotating valve member 118 to any one of a number of selective positions, I have shown a stem 119 projecting from one end of the same thru the lower end of body 116, this stem having a squared portion 121 adapted to fit within a corresponding squared opening in manual selecting lever 122. A nut or cap screw 123 engages the lower end of stem 119, and serves to retain the valve member 118, the valve body 116, and lever 122, in assembled relationship. A suitable compression spring 124 serves to normally urge the tapered valve member 118 within its seat. An opening 126 in the upper portion of valve body 116 establishes communication between the lower portion of cylinder bore 87, and the valve member 118. For establishing communication between any one of the several pressure pipe lines 19 and valve body 116, the valve body is provided with a plurality of discharge openings or passages 127, which are arranged in spaced circumferential relationship and which communicate with the valve seat 117. The valve member 118 is provided with a central passage 128 communicating with the upper opening 126 and cylinder bore 87, and a radially extending port 129, which communicates between the periphery of valve member 118, and central passage 128. Port 129 is adapted to communicate with any one of passages 127, depending upon the position of valve member 118. Thus by moving selecting lever 122 to any one of a number of predetermined positions, the operator can establish communication between the cylinder bore 87 and any one of the pipe lines 19, to effect operation of any one of the valves 13.

In practice it is advisable to provide means which will positively insure return of an actuated valve 13 to normal closed position, when the setting of selecting member 122 is changed. In my invention this is accomplished by having all the passages 127 and therefore all the pressure lines 19, except the passage 127 which is in communication with port 129, in communication thru suitable ports and passages with reservoir 88. Thus valve member 118 has been shown provided with a recess or port 131, which extends about the periphery of valve member 118 a substantial distance and which is capable of communicating with all but one of the passages 127, for one selecting position of lever 122. Recess or port 131 is also adapted to be in continuous communication with a port 132, formed in valve body 116, this port being in communication with reservoir 88 thru passage 133. Therefore for any operating position, all of the passages 127 will be in communication with reservoir 88 thru recess or port 131, port 132 and passage 133, except of course that passage 127 which is in registry with port 129.

In order to facilitate the proper positioning of the selecting lever 122, I preferably provide suitable detent means. Thus I have shown a detent ball 136 slidably retained by lever 122 and adapted to engage in any one of a plurality of notches or recesses 137, these recesses being formed in the lower periphery of body portion 116. Recesses 137 are so spaced that for any one position of the lever 122 with detent ball 136 engaging in a recess 137, port 129 will be in registry with a selected passage 127.

Additional means is provided for interrelating movements of piston 93 with the distributing valve whereby the valve is locked in a selected position when the piston is at the bottom of its stroke. Thus I have shown piston rod 92 having a portion 139 extending below piston 93. An upstanding annular portion 141 is formed upon the upper end of valve member 118, and this portion 141 is provided with a plurality of circumferentially spaced slots 142. These slots are adapted to be selectively engaged by a lug or screw 143 fixed to portion 139 and extending laterally from the same. The arrangement and spacing of slots 142 is such that for any one selected position of lever 122, lug 143 will engage with a corresponding slot 142, when the piston rod 92 is depressed. Therefore when operating lever 98 is held in its lower position corresponding to an actuated or open condition of one of the valves 13, an operator cannot move the selecting lever 122.

Piston 93 is preferably normally urged to its uppermost position, to offset the weight of operating lever 98, and so that this lever will remain in raised or elevated position when liquid is not being dispensed. For this purpose I have shown a helical spring 144 positioned within cylinder bore 87, one end of this spring being seated upon the lower face of piston 93 and the other end being seated upon a suitable thrust washer 146, disposed within valve body 116 as shown.

Figures 13, 15:
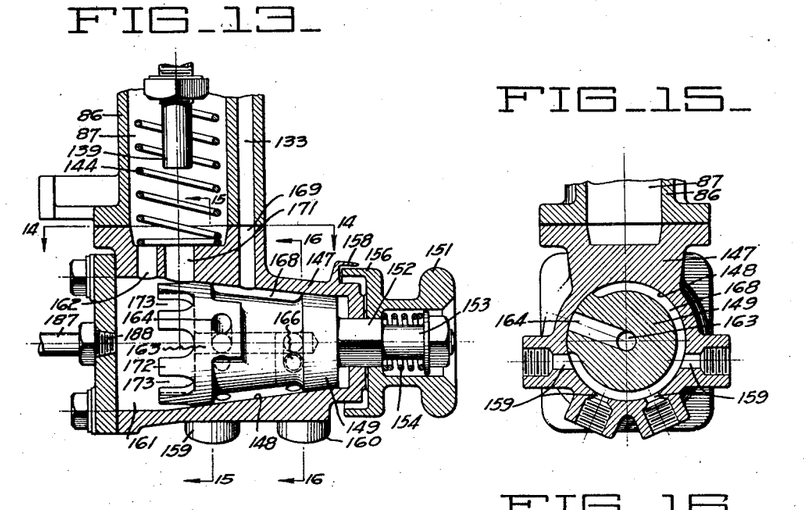
Fig. 13 is a cross sectional detail illustrating a modified form of selecting or distributing valve.
Fig. 15 is a cross sectional view taken along the line 15—15 of Fig. 13.
Figure 14:
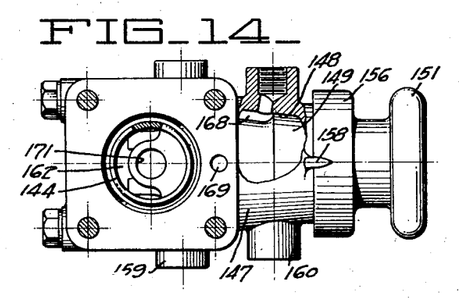
Fig. 14 is a cross sectional view taken along the line 14—14 of Fig. 13.
Figure 16:
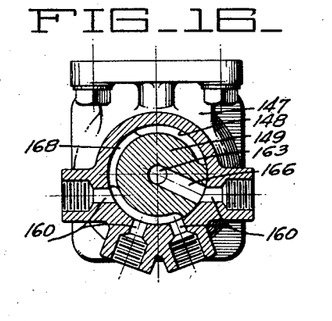
Fig. 16 is a cross sectional view taken along the line 16—16 of Fig. 13.

In the selecting or distributing valve described with reference to Figs. 8 to 12 inclusive, provision is made for connections to only four pressure transmitting lines 19. It is frequently desirable to operate a greater number of valves. In Figs. 13 to 16 inclusive, I have shown a modified form of selecting or distributing valve, which makes possible selective distribution of liquid under pressure to a total of eight pressure lines 19, thus making possible selective operation of eight different valves 13. In this case valve body 147 likewise is provided with a tapered valve seat 148, within which is operably disposed a rotatable tapered valve member 149. The axis of valve member 149 in this case is preferably substantially normal to the axis of cylinder bore 87. In place of lever 122, I have shown an operating knob 151, engaging a square portion 152 on the stem 153. Spring 154 functions the same as spring 124, to normally urge valve member 149 within its seat. An anular flange 156 carried by knob 151, can be provided with a plurality of graduations, cooperating with a suitable fixed pointer 158 to indicate the selected position of valve member 149. Two sets of passages are provided in the valve body 147 for connection with pressure lines 19, these passages being in different spaced planes normal to the axis of valve member 149. One set of passages has been indicated at 159, and the other passages at 160. Passages 159 are shown in Fig. 15, while the other set is shown in Fig. 16. A chamber 161 at the inner end of valve member 149, is in continuous communication with cylinder bore 87 thru port 162. Chamber 161 is also in continuous communication with a passage 163, formed centrally of valve member 149, and this passage 163 establishes communication with radially extending ports 164 and 166.

Each set of passages 159 and 160 are preferably distributed over less than one half the circumference of the valve seat 148. Ports 164 and 166 are likewise preferably extended in opposite directions, or in other words they extend at an angle of about 180 degrees with respect to each other. As knob 151 is rotated, one of ports 164 or 166, say port 164, is brought into successive registry with passages 159, while the other port 166 is out of registry with passages 160. However as knob 151 is rotated beyond 180 degrees, port 166 is brought into successive registry with passages 160, while port 164 remains out of registry with corresponding passage 159. It is therefore apparent that operating knob 151 can be set so that any one of the passages 159 or 160 is in communication with the central passage 163 of valve member 149, and therefore in communication with the cylinder bore 87.

In the modification of Figs. 13 to 16 inclusive, provision is also made for establishing communication between all passages 159 and the reservoir 88, except that passage which is selected. This is similarly accomplished by means of a recess 168, which extends about the major portion of the periphery of valve member 149. For any one selected position of the operating knob 151, port 164 or 166 will be in communication with only one of the passages 159 or 160, while the remainder of these passages will be in communication with reservoir 88, thru recess or port 168, passage 133, and an interconnecting passage 169.

As a means for locking the valve member in any one selected position when the piston rod 92 is at or near its lowermost position, in Fig. 13 I have shown the valve body 147 provided with an opening 171, to receive portion 139 of the piston rod. Valve member 149 is provided with an annular portion 172, which in turn is provided with a plurality of circumferentially spaced slots 173. In its lowermost position, portion 139 engages in one or the other of slots 173, to lock the valve member 149 in any one selected position.

Figure 6:
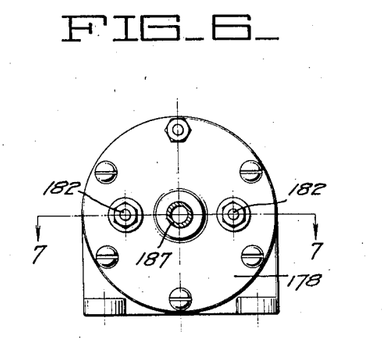
Fig. 6 is an end view of the fluid operated switch which I prefer to employ.
Figure 7:
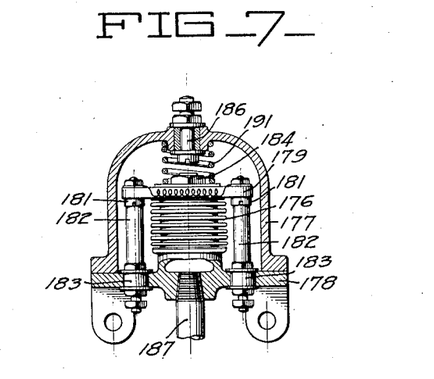
Fig. 7 is a cross-sectional view taken along the line 7—7 of Fig. 6.

When using my system for dispensing liquids of inflammable character, such as gasoline or kerosene, it is desirable to automatically preclude the operation of an associated motive device, which might create a fire hazard by its operation while the liquid is being dispensed. Thus in case of the motor truck arrangement shown in Fig. 1, I preferably provide a switch 174 which is automatically actuated upon actuating the pressure device 17, and which functions to disrupt the ignition circuit to the truck motor. A suitable switch of this character is shown in Figs. 6 and 7. It consists of a bellows or other form of pressure operated cell 176, disposed within a suitable casing 177. Bellows 176 has its one end fixed or mounted upon the metal housing base 178, and its other end carries a movable bar 179. Bar 179 carries movable contacts 181, which are adapted to cooperate with relatively stationary contacts 182. Contacts 182 can be conveniently mounted and supported by base 178, being insulated from direct contact with the base by bushings 183. For convenience in adapting the switch to battery or magneto ignition circuits, I have shown another movable contact 184 carried by bar 179, and this contact is grounded to the housing 177 and base 178, thru the metal bellows 176. Contact 184 is adapted to cooperate with a relatively stationary contact 186, having an insulating mounting upon housing 177. Generally bar 179 is made of insulating material, and contacts 181 are electrically connected together.

If it is desired to include the above switch in a grounded ignition circuit, the live conductor can be connected to contact 186 and the circuit completed thru metal base 178 and the metal frame of the truck. If it is desired to insulate both conductors connected to the switch from the frame of the automobile, such conductors can be connected to the stationary contacts 182. Pipe 187 serves to communicate with the interior of bellows 176, and also connects with the fluid pressure device 17. For example in Fig. 8 such connection is made to passage 188, and in Fig. 13, the connection can be made to chamber 161 as shown.

Assuming that the switch of Fig. 7 is connected in series with the motor ignition circuit, as by making connections to contacts 182, the tension upon bellows 176 is preferably such that when operating lever 98 of the fluid pressure device is depressed, the first effect is to separate contacts 181 from contact 182 and thus interrupt the ignition circuit and preclude operation of the truck motor, and subsequently sufficient pressure is developed to effect opening of one of the valves 13. A proper bias or tension can be maintained upon bellows 176 by means of a suitable compression spring 191. In case the ignition circuit is connected to contact 186, and to base 178 thru the frame of the automobile, contacts 184 and 186 are closed to short circuit the ignition system prior to opening of one of the valves 13.

Figure 2:
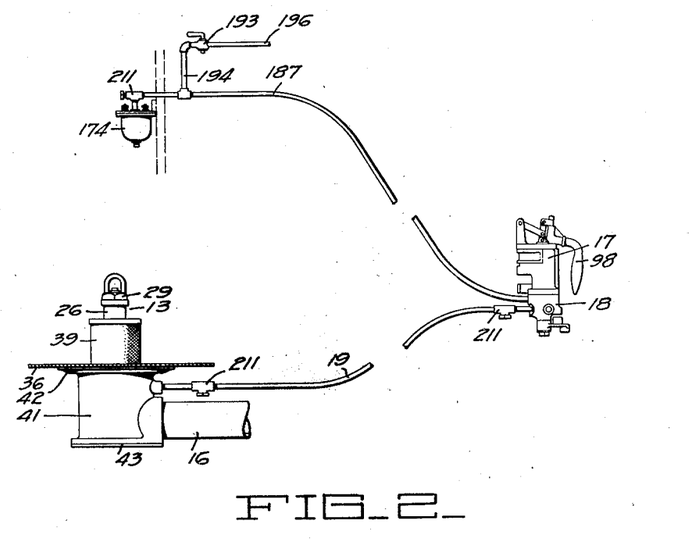
Fig. 2 is a detail, illustrating the manner in which the ignition control switch and the safety relief valve is connected with the other apparatus of my system.

It frequently happens that an operator is at a remote point from the faucet 14, while inflammable liquid is being dispensed. In case of fire or a fire hazard, it is desirable to be able to immediately arrest dispensing of liquid without actually closing one of the faucets 14. To make possible this result I employ a safety valve 193, which is preferably located in the front part of the motor truck at a point conveniently accessible to operation by an operator in the driver's seat. As shown in Fig. 2, one side of this valve is connected to pipe 187, by means of pipe 194, and the other side is connected to liquid reservoir 88 of the fluid pressure device 17, by means of a return pipe 196. When valve 193 is opened in an emergency, liquid flows from pipe 187, thru pipe 196, back to reservoir 88, thus entirely relieving the liquid pressure beneath piston 93, and causing the operated valve 13 to return to closed position.

Figure 17:
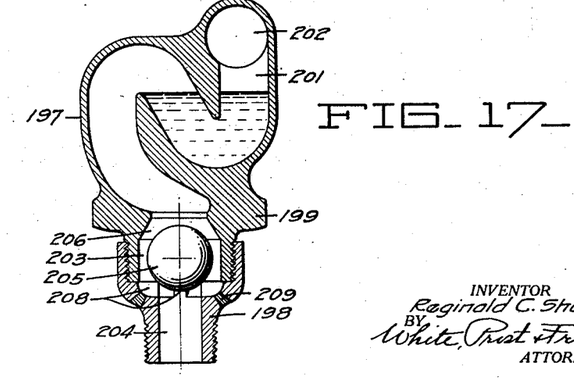
Fig. 17 is a cross sectional elevational view illustrating the construction of a vent which I prefer to employ with my system.

In order to permit the entrance and escape of air from the tank 12, I preferably provide each tank with a suitable vent device 197. A suitable construction for this device has been shown in Fig. 17. It consists of one part 198 adapted for connection with a liquid tank, and another connected part 199, having a passage 201, vented to the atmosphere thru opening 202. The other end of passage 201 communicates with the tank thru a valve chamber 203 and passage 204. To provide a suitable check valve, a ball 205 is positioned within chamber 203 and is adapted to cooperate with a suitable valve seat 206. Passage 201 is preferably sinuous as shown, to provide a liquid trap. Ordinarily ball 205 rests upon spaced lugs 208, so that a certain amount of liquid and gas is free to flow into and out of the associated tank. A certain amount of liquid accumulating in passage 201, serves as a liquid seal. In case the tank is tipped over or upset, the rush of liquid against ball 205 forces this ball against seat 206, thus preventing the discharge of liquid thru passage 201 and opening 202. In some instances, as for example in case of fire or an explosion, it may be dangerous to provide such a check valve for preventing the discharge of liquid from the tank. To minimize this danger, I provide a plurality of plugs 209 in part 198, these plugs being made of relatively soft metal which will blow out in case the pressure within the tank reaches a dangerous degree, and which will melt at a relatively low temperature in case of fire. By the discharge of gas and liquid thru the ports provided by blowing out or fusing of these plugs 209, internal pressure in the tank can be relieved to prevent the tank from bursting.

It will be noted from the above description that in various parts of my system I have made provision for minimizing danger connected in the dispensing of inflammable liquids. To provide a further factor of safety, I prefer to insert fusible elements 211, in each of the fluid pressure lines 19, and these elements are preferably relatively close to the connections of pipes 19 with the valves 13. These elements are provided with metal plugs which fuse at a relatively low temperature, so that in case of fire beneath the tanks or in proximity to the elements 211, the plugs will be fused to relieve the fluid pressure in any one of the lines 19, and to effect automatic closure of an actuated valve 13.

It is believed that the operation of my complete system will be obvious from the above detailed description. However to briefly review this operation, the operator first determines the tank from which liquid is to be dispensed, and then the distributing or selecting valve 18 is set to this tank. Lever 98 of device 17 is then depressed, and liquid under pressure conveyed thru one of pipes 19 causes opening of one of the valves 13. The corresponding faucet 14 is also opened to permit the discharge of a desired amount of liquid. While liquid is being dispensed, the lever 98 may be left in a depressed position and it will retain such position without manual force. When sufficient liquid has been dispensed, faucet 14 is closed manually and the lever 98 is returned to its original position. While the lever 98 has been depressed, fluid pressure on switch 174 has disrupted the ignition circuit for the truck motor, thus preventing the motor from operating. If it is desired to remove liquid from another tank, the setting of distributing valve 18 is changed and the operation repeated.

I claim:

1. In a system of the character described, a plurality of fluid pressure operated valves, a source of fluid under pressure, selecting means including a selecting member movable to any one of a plurality of positions to effect operation of a selected valve by fluid under pressure from said source, and means for locking said member in a selected position while a valve is in actuated condition responsive to fluid pressure from said source.

2. In a system of the character described, a plurality of fluid pressure operated valves, a casing formed to provide a fluid cylinder, a piston operating in said cylinder, a selecting valve mounted upon said casing, and a plurality of pipe connections between said selecting valve and said pressure operated valves, said selecting valve having communication with said cylinder.

3. In a system of the character described, a plurality of fluid pressure operated valves, a casing formed to provide a fluid cylinder, a piston operating in said cylinder, a selecting valve mounted upon said casing, said valve including a movable valve member, a plurality of pipe connections between said selecting valve and said pressure operated valves, said selecting valve having communication with said cylinder, and means for locking said valve member in one selected position during a compression stroke of the piston.

4. In a system of the character described, a plurality of fluid pressure operated valves, a device operative to compress fluid, a selecting valve communicating with said device, pipe connections between said selecting valve and the various pressure operated valves, a fluid reservoir in communication with said device, and means serving to establish communication between said pipe connections and said reservoir with the exception of that selected pipe in communication with said device thru said selecting valve.

5. In a system of the character described, a plurality of fluid pressure operated valves, a device operative to compress fluid, a selecting valve communicating with said device, said valve including a movable ported valve member, pipe connections between said selecting valve and the several pressure operated valves, a fluid reservoir in communication with said device, said selecting valve serving to establish communication between any one of said pipes and said device dependent upon the position of said valve member, and means including a port in said member serving to establish communication between all of said pipes and said reservoir except that pipe selected to be in communication with said device.

6. In a system of the character described, a liquid tank, a casing secured to a lower wall of the tank and communicating therewith, a liquid conduit connected to said casing, and a pipe for fluid under pressure also connected to said casing, a fluid pressure operated valve structure detachably secured to said casing and tank and serving to control flow of liquid from the tank into the casing, and means for establishing detachable communication between said structure and said fluid pressure pipe, said casing having a removable wall to enable removal of the valve structure bodily thru the casing without disrupting the connections between the conduit and said pipe with the casing.

7. In a system of the character described, a liquid tank, a casing secured to a lower wall of the tank and communicating therewith, a liquid conduit connected to said casing, and a pipe for fluid under pressure also connected to said casing, a fluid pressure operated valve structure detachably secured to said casing and tank and serving to control flow of liquid from the tank into the casing, and means for establishing detachable connection between said structure and said fluid pressure pipe, said structure being removable as a unit from said casing without disrupting the connections between the conduit and said pipe with the casing.

REGINALD C. SHAND.